Feb. 14, 1933.    B. P. SCHOLZ    1,897,591
GEAR SHIFTING APPARATUS
Filed Jan. 11, 1932    5 Sheets-Sheet 1

NEUTRAL

FIRST

Burton Pollard Scholz,
Inventor,
Delos G. Haynes,
Attorney.

Feb. 14, 1933. B. P. SCHOLZ 1,897,591

GEAR SHIFTING APPARATUS

Filed Jan. 11, 1932 5 Sheets-Sheet 2

SECOND

HIGH

Burton Pollard Scholz,
Inventor.
Delos G. Haynes,
Attorney.

Feb. 14, 1933.  B. P. SCHOLZ  1,897,591
GEAR SHIFTING APPARATUS
Filed Jan. 11, 1932   5 Sheets-Sheet 3
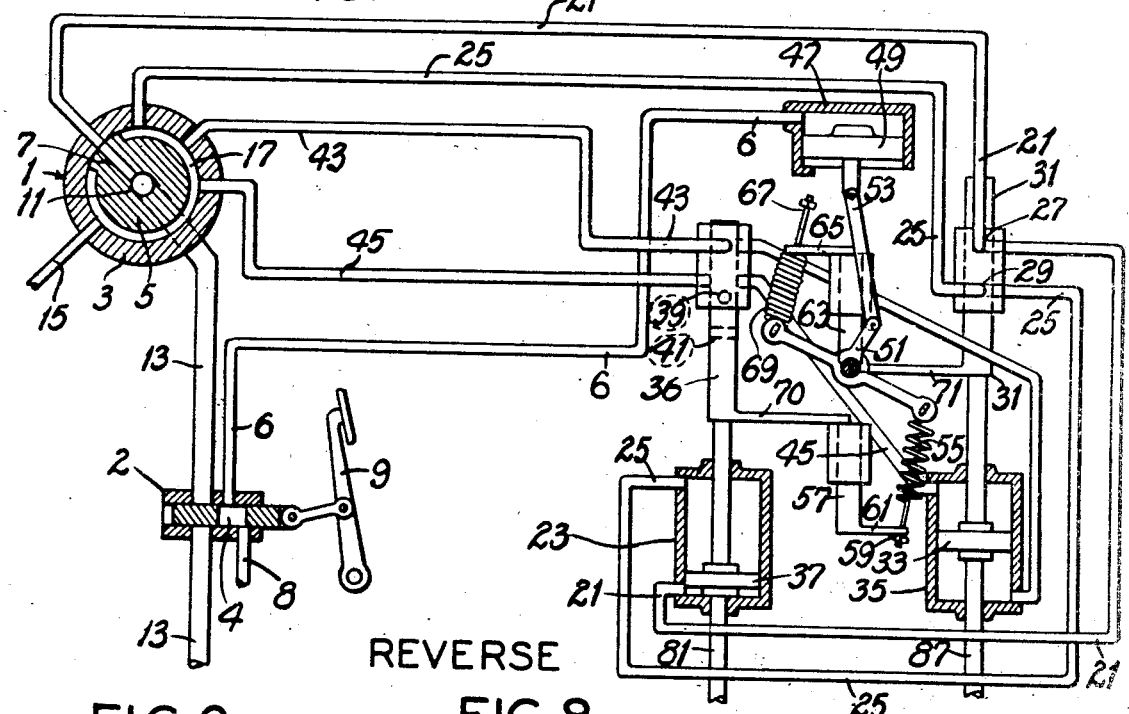
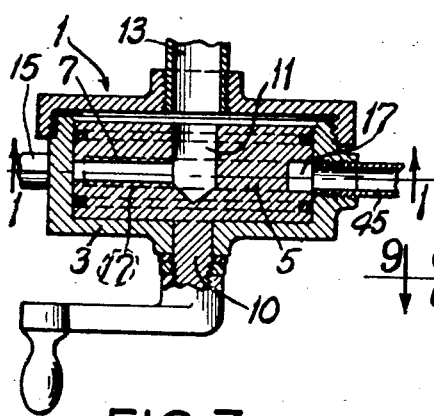
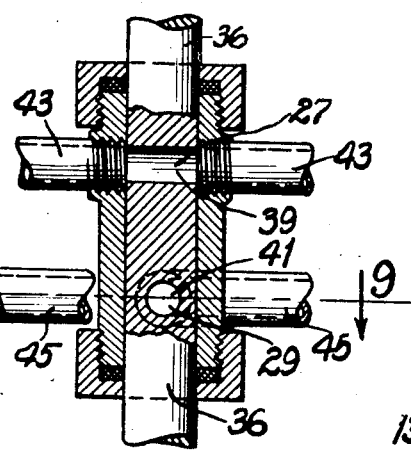
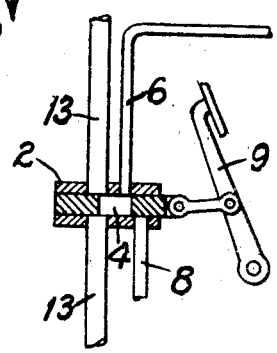
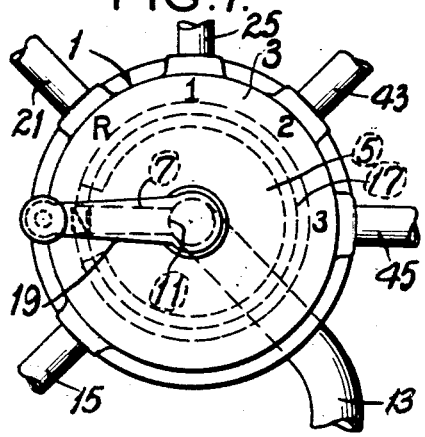
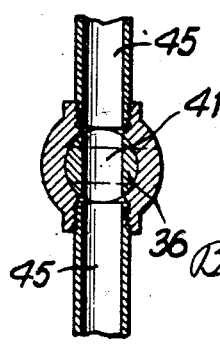

REVERSE

REVERSE

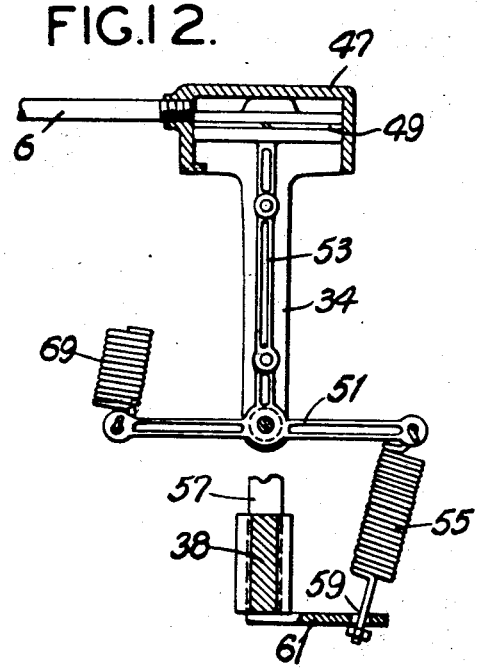
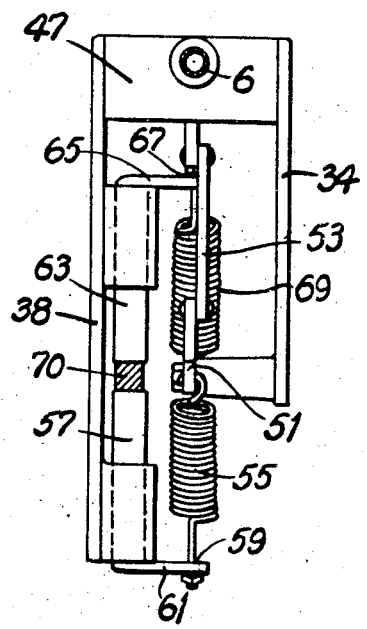
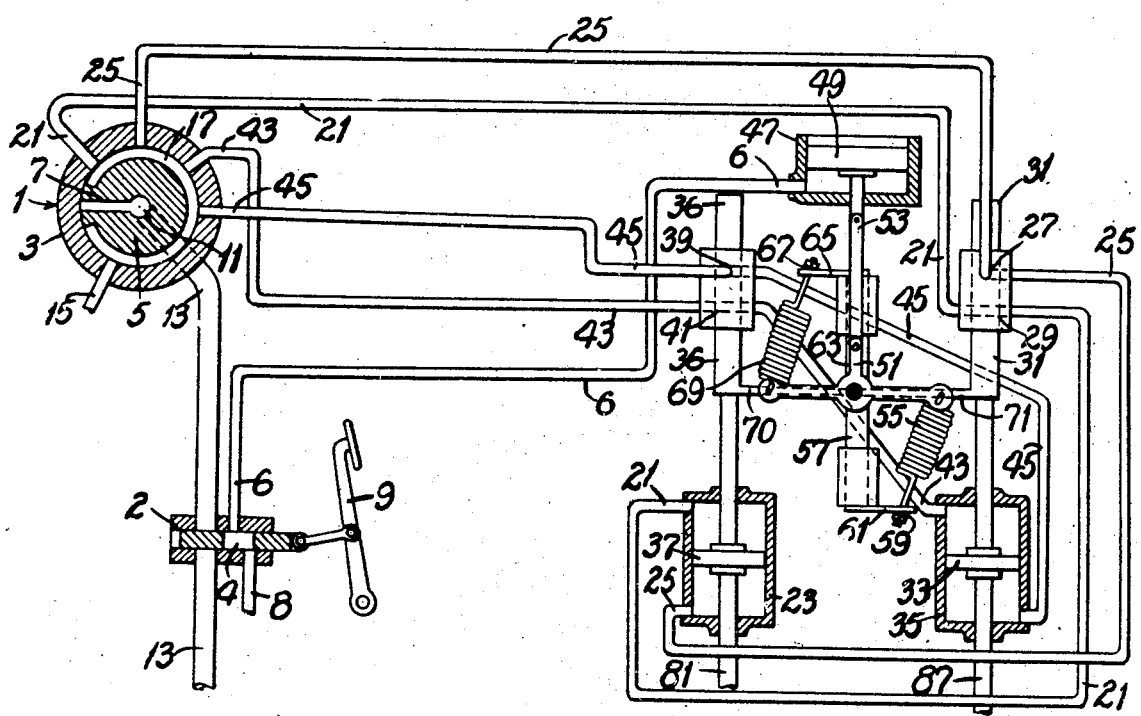
PRESSURE TYPE
NEUTRAL

Patented Feb. 14, 1933

1,897,591

UNITED STATES PATENT OFFICE

BURTON POLLARD SCHOLZ, OF WEBSTER GROVES, MISSOURI

GEAR SHIFTING APPARATUS

Application filed January 11, 1932. Serial No. 585,962.

This invention relates to gear shifting apparatus, and with regard to certain more specific features, to pneumatic apparatus for shifting gears of automotive transmissions and the like.

Among the several objects of the invention may be noted the provision of means whereby the manual exertion necessary for shifting gears is reduced to a minimum, there being provided means whereby a light manual operation is relayed through a suitable means to effect ample forces for shifting gears against substantial resistances; the provision of advantageous safety features in apparatus of this class; and the provision of apparatus of the class above described which is simple in construction and rugged in operation. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a diagrammatic view showing the device in neutral position, the horizontal section of the valve therein shown being taken substantially along line 1—1 of Fig. 6;

Fig. 5 is a diagrammatic view similar to Fig. 1, showing the parts in position for reversing operation;

Fig. 6 is a cross-section taken substantially along lines 6—6 of Fig. 1;

Fig. 7 is a plan view of the device of Fig. 6;

Fig. 8 is a section taken through certain cut off parts, and is taken substantially on line 8—8 of Fig. 1;

Fig. 9 is a horizontal section taken substantially along the lines 9—9 of Fig. 8;

Figs. 12 and 13 are, respectively, a fragmentary plan, and a side elevation, showing certain structural details;

Fig. 14 is a view similar to Fig. 1 illustrating an alternative form of the invention; and, Fig. 15 is a detail showing an alternate clutch pedal and valve position.

Similar reference characters indicate corresponding parts throughout the several views of the drawings.

Figure 1:
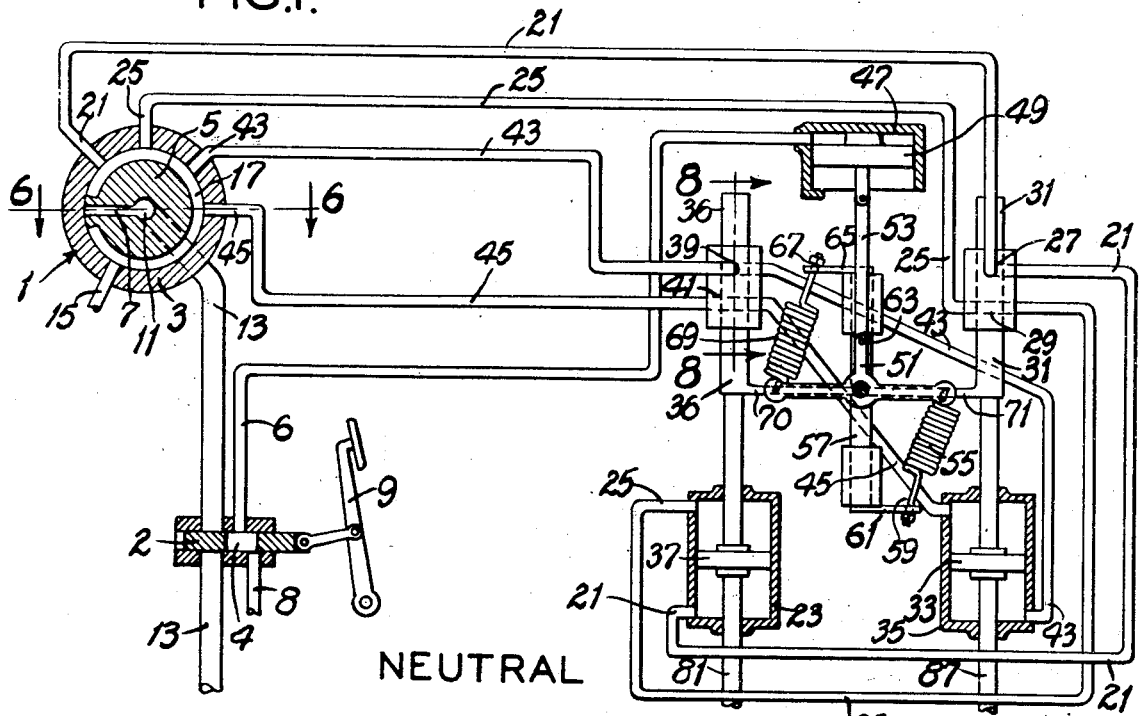

Referring now more particularly to Fig. 1, there is shown at numeral 1 a selector control valve comprising a body 3 having a rotatable core 5, the latter having a port 7. The port 7 is in communication with a central port 11, the latter also communicating with a line 13 which leads to suitable vacuum apparatus, such as the intake manifold of the automotive engine found on the vehicle to which the present invention applies, or to a vacuum or pressure pump. Whether vacuum or pressure apparatus is used depends upon the form of the invention used, as will be shown. With the preferred form vacuum apparatus is to be used (Figs. 1 to 5).

The line 13 is intersected by a slide valve 2 having a port 4 adapted to align with the opening in pipe 13 when the clutch pedal 9 is thrown to clutch opening position (Fig. 15). In Figs. 1, 2, 3 and 4, the clutch pedal is in closed position; hence valve 2 is drawn shut, so far as the line 13 is concerned, but at this time the port 4 connects the pipe 6 to an atmospheric relief 8. It is thus clear that a vacuum is only available at the control valve 1 when the clutch of the vehicle is open, thus making it impossible to have the gears shifted (under control of said control valve 1) except when said clutch is properly open. As stated, when the clutch is closed (Fig. 1), the line 6 is also opened to relief 8 by said port 4; but when the clutch is opened (Fig. 15) said relief 8 is cut off and the line 6 is in communication with the vacuum line 13.

An atmospheric relief pipe 15 is also arranged in the core 5. In the plane of this relief port is a peripheral port 17.

The core is provided with an outwardly extending stem 10 having a suitable handle 19 for the purpose of manually rotating the core.

Emanating from the body 3 of the valve 1 is a series of pipes arranged in the plane of the ports 7 and 17. Pipe 21 passes to the lower end of a cylinder 23. Pipe 25 passes to the upper end of said cylinder 23. Both of said pipes 21 and 25 pass to the cylinder 23 by way of valve ports 27 and 29 respectively, said ports being arranged in a stem 31 which extends from a selector piston 33, the latter operating in a second cylinder 35. A similar extension 36 from the selector piston 37 which reciprocates in said cylinder 23 carries ports 39 and 41. Port 39 controls a pipe 43 passing from said valve 1 to the lower end of the cylinder 35. The port 41 controls a pipe 45 which passes to the upper end of said cylinder 35.

In Figs. 8 and 9 are shown the ports 27, 29 and these also exemplify ports 39 and 41. As is clear from Fig. 1, the ports 27, 29 and 39, 41 open their respective lines only when the pistons 33 and 37 are in central or neutral position within their cylinders. When said pistons are out of neutral position, the ports 27, 29 and/or 39, 41 are out of communication with their respective lines. Thus when either of the pistons 33 or 37 are out of neutral position, the other cylinder carrying the other piston is out of communication with the valve 1. Hence it is impossible to carry on any operation in either of the cylinders 23 or 35 until the other cylinder has its piston in neutral position. This, as it will be seen, prevents meshing more than one pair of gears at a time and thus prevents inconsistent operation which might otherwise cause damage.

The line 6 is in communication with the upper end of a third cylinder 47, the latter carrying a piston 49. The piston or slider 49 is connected with a double bell crank 51 by means of a connecting rod 53, the piston 49, connecting rod 53 and bell crank 51 forming a slider crank mechanism (see Fig. 12). An extension 34 from the cylinder 47 forms the frame for this mechanism.

The bell crank 51, through a spring 55 has a connection with a slider 57. The slider 57 reciprocates in another frame extension 39 from said cylinder 47. There is also a lost-motion engagement 59 between the spring 55 and the arm 61 of said slider 57. This has certain uses to be described.

The other arm of the double bell crank 51 has a similar connected spring 69 and a lost-motion engagement between said spring 69 with a slider 63. The slider 63 has an arm 65 for making the lost-motion engagement 67 with the spring 69.

These sliders 57 and 63 normally abut against the end of extensions 70 and 71 from the extension rods 36 and 31 respectively of said pistons 33 and 37 respectively.

The normal condition is shown in Fig. 1 wherein the apparatus is in neutral position with the clutch closed. When the clutch is opened, a vacuum is created in the port 7 of the valve 1. The valve 1 being set for neutral, no connection is made with any of the pipes 21, 25, 43 or 45. However, a vacuum at this time is created in the branch line 6 and communicated by way of the port 4 to the line 6 causing the centralizing or neutralizing piston 49 in cylinder 47 to be drawn to the top shown in Fig. 1. A slight tension in the springs 55 and 69 at this time insures drawing the sliders 57 and 63 against the extensions 70 and 71 to hold the pistons 33 and 37 at the central portions of their cylinders. If the clutch be opened the vacuum above the piston 49 is broken but the pistons 33 and 37 remain at rest because of the detents ordinarily associated with the shifter rods which they operate.

Figure 10:
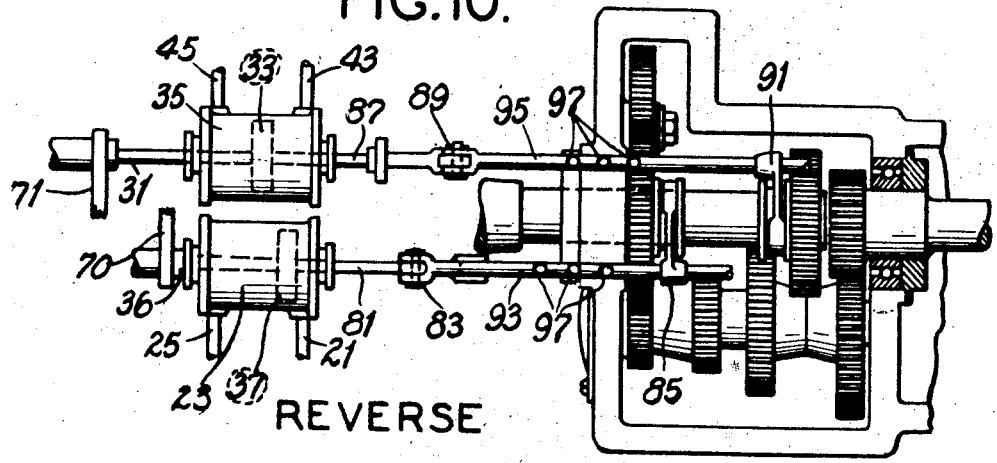
Fig. 10 is a plan view showing the device connected to an open gear box, the apparatus being set for reverse operation.
Figure 11:
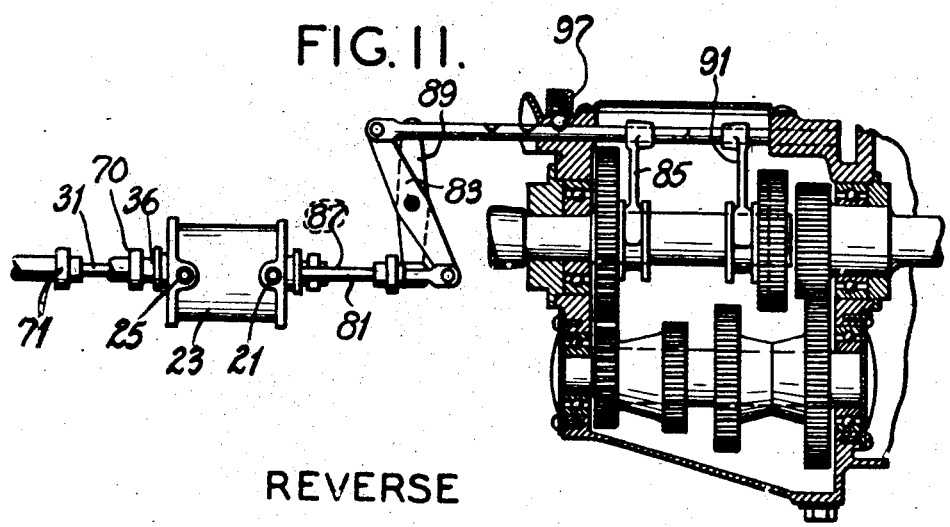
Fig. 11 is a side elevation of Fig. 10, parts being shown in section for clarity.

At this stage a description of the gear box used in connection with the pistons 33 and 37 will be given. The connections are shown in Figs. 10 and 11. These figures show reverse connections corresponding to the arrangement shown in Fig. 5. From piston 37 there is an extension 81 which, through a linkage 83 serves to effect operation of shifter fork 85. Likewise, the piston 33 has an extension 87 which, through a linkage 89 serves to operate a shifter fork 91.

The shifter forks 85 and 91 comprise portions of the known selective gear change box used on automotive vehicles and the like. The fork 85 selectively controls first and reverse speed and the fork 91 selectively controls second and high speed. As will be clear from the remainder of this specification, each of the forks must necessarily assume a neutral position (gears controlled thereby being disconnected) when the other fork is in non-neutral position (gears being connected). The neutral position of a given fork must always be assumed before the other fork is activated to throw its gears into mesh. The details of the gear box will not be further elaborated, because these are obvious from the Figs. 10 and 11 in view of the known characters of such boxes. The detents for the rods 93 and 95 are shown at numeral 97. These are also known.

Returning to Fig. 1, the port 4, when the clutch closes, puts the pipe 6 in communication with the relief 8 and thus is equalized pressure on both sides of the piston 49.

Figure 2:
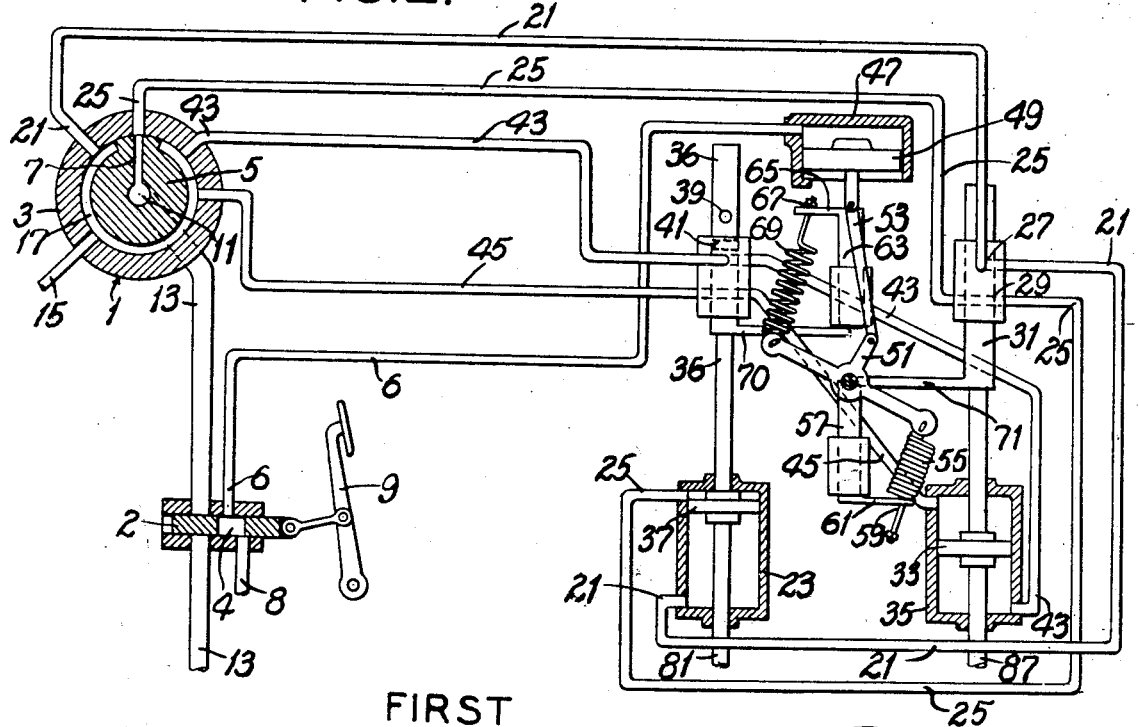
Fig. 2 is a diagrammatic view similar to Fig. 1, showing the parts in position for first speed operation.

To shift the mechanism to the first speed position shown in Fig. 2, the valve 1 is set so that the port 7 communicates with the pipe 25. The clutch is then momentarily opened, thus causing the pipe 13 to be opened to the vacuum and hence drawing a vacuum in said pipe 25; also in pipe 6. The piston 33 being thus at central position causes the port 29 to be open and thus the vacuum is transmitted to the upper end of the cylinder 23 and the piston 37 is drawn up as shown at Fig. 2. The momentary opening of the clutch, as stated, also causes the vacuum to be transmitted to pipe 6 and thus to positively hold up the piston 49 and preventing the piston 33 from moving down. When the arm 70 pushes its slider 63 to the position shown in Fig. 2, this is done by stretching the spring 69. When the clutch is released for re-closing, the piston 49 in cylinder 47 will assume the position shown in Fig. 2, wherein the tension in spring 69 has caused the bell cranks 51 to be rotated clockwise to draw down said piston 49, the vacuum above piston 49 being broken.

Figure 3:
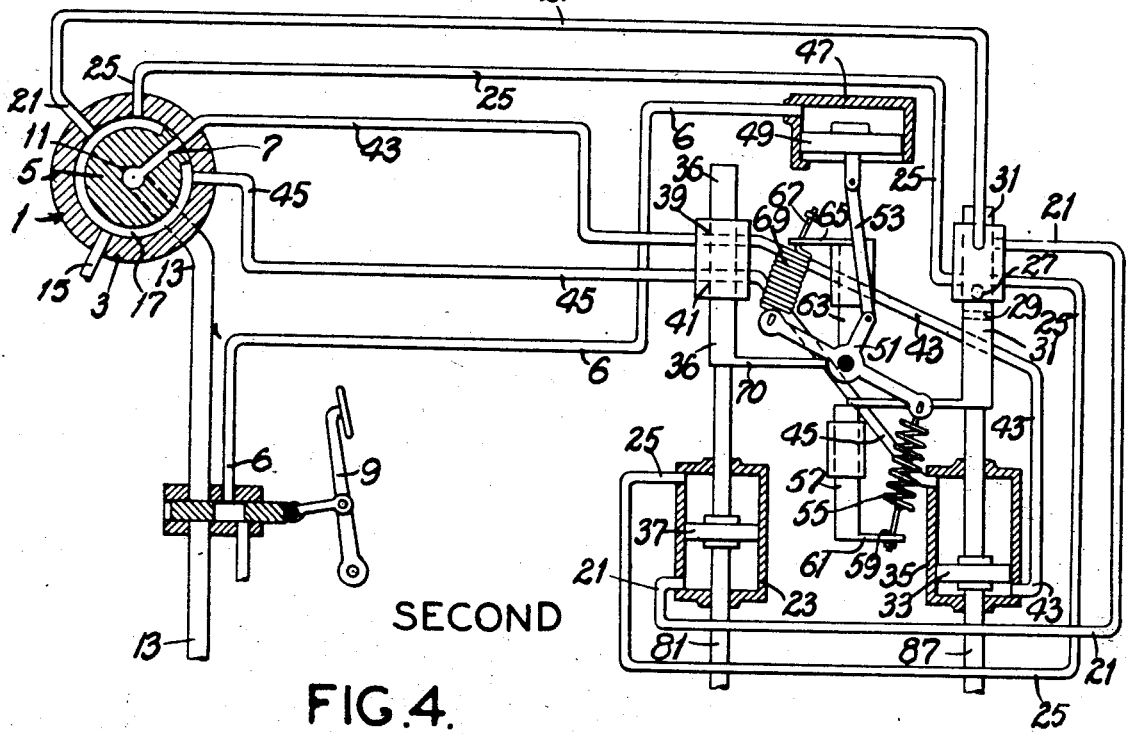
Fig. 3 is a view similar to Fig. 1 showing the parts in position for second speed operation.

To go to second speed conditions, illustrated as Fig. 3, the valve 1 is set so that the port 7 is in communication with the pipe 43, as shown. No vacuum is transmitted to the cylinder 35 until the piston 37 is again centralized. When the clutch is opened a vacuum will be transmitted through the line 6 to positively draw up the piston 49 and cause the bell crank 51 to be rotated counterclockwise. Hence the slider 63 is drawn down and also the arm 70, with the result that the piston 37 is centralized, air being at this time admitted above piston 37 by reason of the pipe 25 being in temporary communication with the atmosphere by way of port 17 and relief 15, while the valve 1 was being set and for a short period thereafter. This action results in the port 30 transmitting the vacuum in line 43 to the lower end of the cylinder 35, whereby the conditions of Fig. 3 are attained. It will be noted that the ports 27 and 29 are automatically closed off so that the piston 37 cannot thereafter be decentralized.

Figure 4:
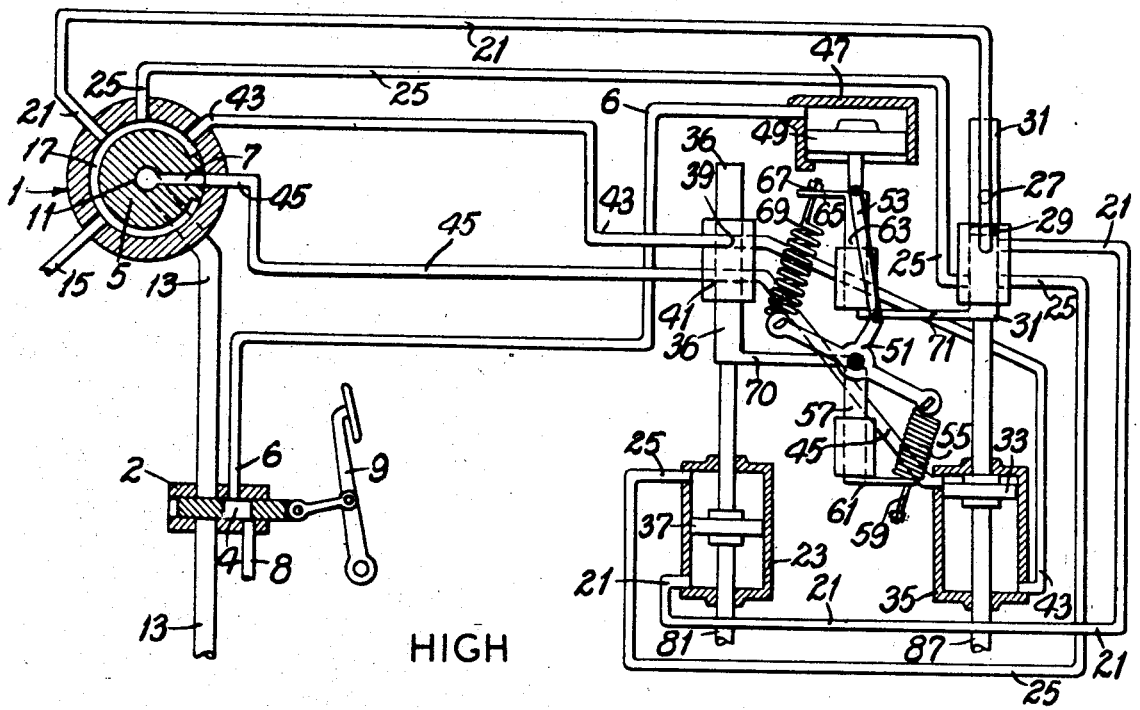
Fig. 4 is a view similar to Fig. 1 showing the parts in position for third or "high" speed operation.

High or third speed position is shown in Fig. 4 wherein the port 7 is in communication with the line 45. Momentary opening of the clutch causes a vacuum in the line 6, thus temporarily pulling up the piston 49 and effecting a counterclockwise rotation of the bell crank 51.

This effects a tendency to draw up the piston 33 to neutral position but the lost-motion connection 67 results in no motion being transmitted to the centrally located pistons 37. At the same time the vacuum in the line 45 tends to further draw up the piston 33. When the clutch is again closed, air passes above the piston 49, thus permitting it to drop down. However, the vacuum above the piston 33 is not broken by any release effect and therefore the piston 33 having traveled to the top of the cylinder, remains there, the spring 69 permitting it do so, because of the permitted clockwise action of the bell crank 51. It will be understood that at this time the extension 71 causes the slider 63 to rise and that if the piston 49 were not permitted to descend by breaking the vacuum above it that the piston 33 could not be drawn up to the end of the cylinder.

In Fig. 5 is shown the connection for reverse positioning of parts wherein the port 7 is in communication with the line 21. Temporary opening of the clutch results in the temporary evacuation of the space above the piston 49 (Fig. 4) so that the bell crank 51 is moved counterclockwise, thus drawing down the piston 33 by way of the spring 69, arms 65, slider 63 and extensions 71. Any vacuum above the piston 33 is broken by reason of the fact that the line 45 is then in communication with the relief port 15 by way of the port 17.

After the piston 33 has been centralized, the port 27 opens, thus transmitting the vacuum in line 21 to the bottom of the cylinder 23, thus tending to draw down the piston 37. When the clutch is again closed, the vacuum above the piston 49 is broken by way of line 6 and the temporarily continuing vacuum beneath the piston 37 draws down said piston 37, the spring 55 at this time permitting the same because of the counterclockwise action of the bell crank 51 caused by breaking the vacuum above the piston 49.

It should be understood that the piston 49 remains at the top of the cylinder until the clutch is returned to effect engagement and to open the line 8 to the line 6.

In Fig. 14 is shown the modification of the invention wherein a pressure is used, instead of a vacuum. Like numerals indicate like parts. Attention is called to the fact that the only changes required are that the pipe 6, instead of being connected to the top of the cylinder 47 is connected to the bottom, so that the pressure forces the piston 49 up at the proper time, instead of a suction drawing said piston up. Also, the pipes 21 and 25 on the cylinder 23 are interchanged, as indicated. Pipes 43 and 45 are also interchanged. Thus, instead of using sub-atmospheric pressure on one side of the piston, a superatmospheric pressure is used on the other side thereof. The relative differences between the respective pressures on opposite sides of the pistons has not been changed.

It is to be understood that the drawings are diagrammatic and that the piston ratios and mechanical advantages of the linkages therebetween are designed as to size to bring out the functions above set out.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In apparatus of the class described, two pneumatic cylinders, two reciprocating pistons therein respectively adapted to selectively shift gears, vacuum lines connected to the ends of said cylinders, valves controlled by the respective pistons to be opened when the pistons are unaffected by any vacuum and to be closed when they are so affected, the lines from a given cylinder passing through the valve controlled by the other cylinder and means selectively communicating the respective lines with a vacuum, said last-named means having a relief port for relieving the vacuum in all other of said lines except the one which is in communication with said vacuum and means for placing the piston which is not presented to the vacuum at neutral position, said last-named means comprising a third piston and cooperating cylinder, a linkage connecting said third piston with said former two pistons and a line adapted to present said last-named piston to said vacuum.

2. In apparatus of the class described, two pneumatic cylinders, two reciprocating pistons therein respectively adapted to selectively shift gears, vacuum lines connected to the ends of said cylinders, valves controlled by the respective pistons to be opened when the pistons are unaffected by any vacuum and to be closed when they are so affected, the lines from a given cylinder passing through the valve controlled by the other cylinder and means selectively communicating the respective lines with a vacuum, said last-named means having a relief port for relieving the vacuum in all other of said lines except the one which is in communication with said vacuum and means for placing the piston which is not presented to the vacuum at neutral position, said last-named means comprising a third piston, a linkage connecting said third piston with said former two pistons and a line adapted to present said last-named piston to said vacuum and a valve adapted to be temporarily opened to effect a vacuum at said third piston and at only a predetermined one of said two pistons at a given time.

3. In apparatus of the class described, valves, two cylinders, two pistons in said cylinders respectively, extensions from said pistons adapted to operate elected gear shifting means, said valves being operated by said pistons, lines connected to opposite ends of said cylinders adapted to communicate variations in pressure thereto, the lines for a given cylinder passing through the valve controlled by the piston in the other cylinder, a third cylinder, means for conveying a change in pressure to said third cylinder, a piston therein operated by said change in pressure, a linkage between said third piston and said two pistons adapted to centralize the latter upon operation of the third piston and means for conveying change in pressure to one of the two cylinders and to the third cylinder at the same time, whereby positive centralization of the first two pistons is effected, said means being temporarily operable.

In testimony whereof, I have signed my name to this specification this 4th day of January, 1932.

BURTON POLLARD SCHOLZ.